United States Patent
Samura et al.

(10) Patent No.: US 12,461,126 B2
(45) Date of Patent: Nov. 4, 2025

(54) PROBE DEVICE

(71) Applicant: Hitachi High-Tech Corporation, Tokyo (JP)

(72) Inventors: Naoki Samura, Tokyo (JP); Yasuhiko Nara, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 130 days.

(21) Appl. No.: 18/566,151

(22) PCT Filed: Jun. 29, 2021

(86) PCT No.: PCT/JP2021/024581
§ 371 (c)(1),
(2) Date: Dec. 1, 2023

(87) PCT Pub. No.: WO2023/276002
PCT Pub. Date: Jan. 5, 2023

(65) Prior Publication Data
US 2024/0288472 A1    Aug. 29, 2024

(51) Int. Cl.
*G01R 1/067* (2006.01)
*G01R 1/04* (2006.01)
*G06T 7/73* (2017.01)

(52) U.S. Cl.
CPC ....... *G01R 1/06794* (2013.01); *G01R 1/0408* (2013.01); *G06T 7/74* (2017.01);
(Continued)

(58) Field of Classification Search
CPC ...... G01R 1/06794; G01R 1/0408; G06T 7/74
See application file for complete search history.

(56) References Cited

U.S. PATENT DOCUMENTS 4,864,227 A * 9/1989 Sato ................ G01R 1/06794
324/750.19
5,091,692 A * 2/1992 Ohno ................ G01R 1/07314
348/130
(Continued)

FOREIGN PATENT DOCUMENTS

CN    103733299 A    4/2014
JP    5-34143 A      2/1993
(Continued)

OTHER PUBLICATIONS

Chinese-language Office Action issued in Taiwanese Application No. 111121396 dated Mar. 24, 2023 with partial English translation (4 pages).
(Continued)

*Primary Examiner* — Paresh Patel
(74) *Attorney, Agent, or Firm* — Crowell & Moring LLP

(57) ABSTRACT

A probe device includes a sample stage 125 that supports a sample, a probe unit 143 to which a probe 141 brought into contact with a predetermined sample surface of the sample is attached, a first camera 111A that images the sample and the probe, and a first camera optical axis adjustment stage 112A that adjusts an optical axis of the first camera, in which the optical axis of the first camera is parallel to the sample surface, and the first camera optical axis adjustment stage allows the optical axis of the first camera to be moved in a direction perpendicular to the sample surface.

14 Claims, 15 Drawing Sheets

(52) U.S. Cl.
CPC ............... *G06T 2207/10061* (2013.01); *G06T 2207/30148* (2013.01); *G06T 2207/30204* (2013.01)

(56) References Cited

U.S. PATENT DOCUMENTS

| | | | |
|---|---|---|---|
| 5,394,100 A * | 2/1995 | Bohler | G01R 31/311 356/3 |
| 10,488,434 B2 | 11/2019 | Godec-Schoenbacher et al. | |
| 2005/0083038 A1* | 4/2005 | Rothaug | G01R 1/06794 324/750.02 |
| 2005/0139781 A1 | 6/2005 | Hazaki et al. | |
| 2005/0263702 A1 | 12/2005 | Agemura et al. | |
| 2006/0043287 A1 | 3/2006 | Munekane | |
| 2006/0231773 A1 | 10/2006 | Katagiri et al. | |
| 2014/0059724 A1 | 2/2014 | Iyoki et al. | |
| 2014/0361167 A1 | 12/2014 | Morishita et al. | |
| 2018/0143221 A1 | 5/2018 | Koller et al. | |
| 2019/0049486 A1 | 2/2019 | Godec-Schoenbacher et al. | |
| 2020/0266031 A1 | 8/2020 | Suzuki et al. | |
| 2022/0392793 A1* | 12/2022 | Buxbaum | G06T 7/50 |

FOREIGN PATENT DOCUMENTS

| | | |
|---|---|---|
| JP | 2003-315238 A | 11/2003 |
| JP | 2005-189239 A | 7/2005 |
| JP | 2006-93102 A | 4/2006 |
| JP | 2006-294481 A | 10/2006 |
| JP | 4675615 B2 | 4/2011 |
| JP | 2013-243027 A | 12/2013 |
| JP | 2014-44075 A | 3/2014 |
| JP | 2018-84582 A | 5/2018 |
| JP | 2019-35741 A | 3/2019 |
| TW | 202037896 A | 10/2020 |

OTHER PUBLICATIONS

International Search Report (PCT/ISA/210) issued in PCT Application No. PCT/JP2021/024581 dated Oct. 5, 2021 with English translation (4 pages).

Japanese-language Written Opinion (PCT/ISA/237) issued in PCT Application No. PCT/JP2021/024581 dated Oct. 5, 2021 with English translation (5 pages).

* cited by examiner

[FIG. 1]
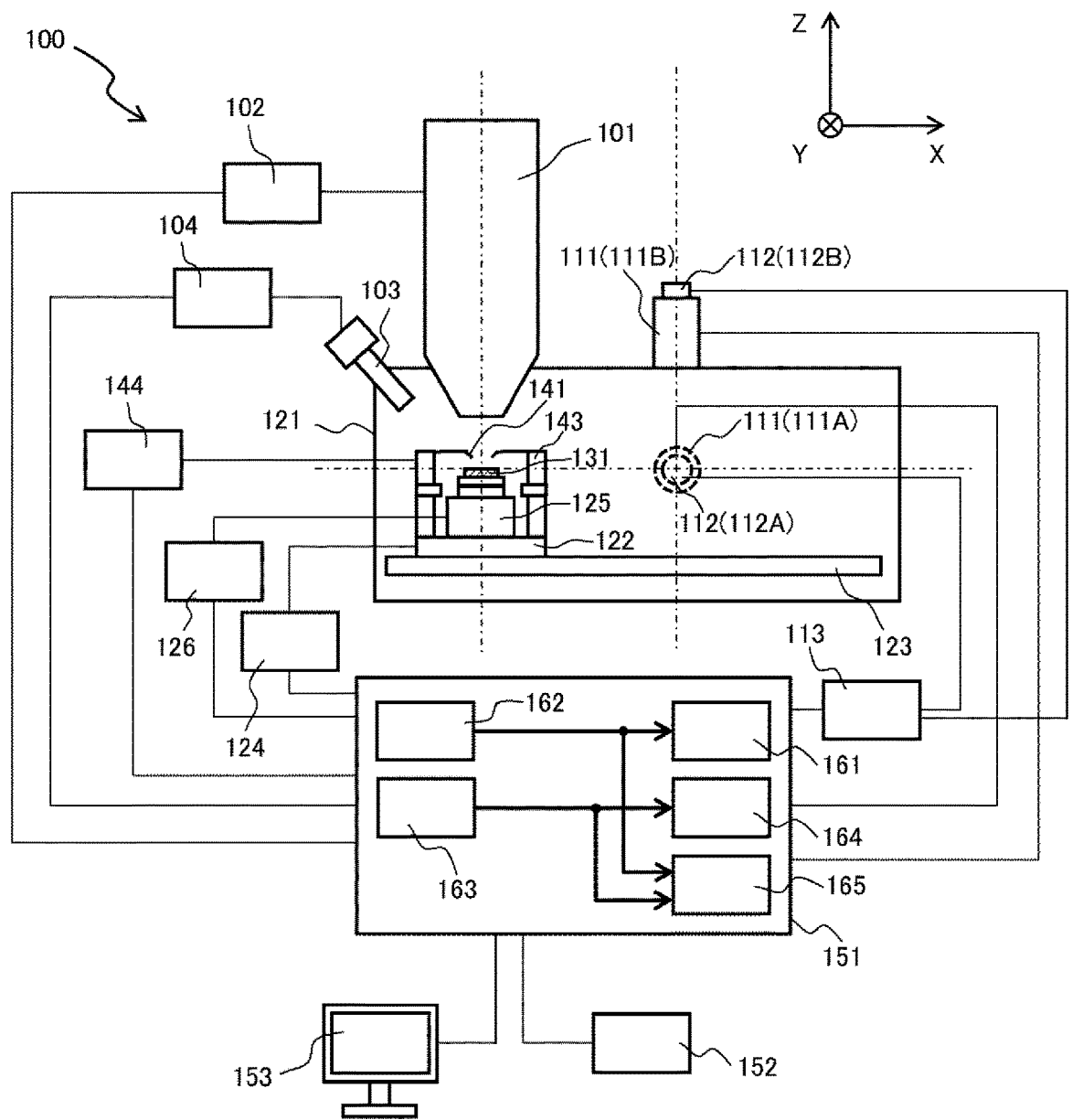

[FIG. 2]
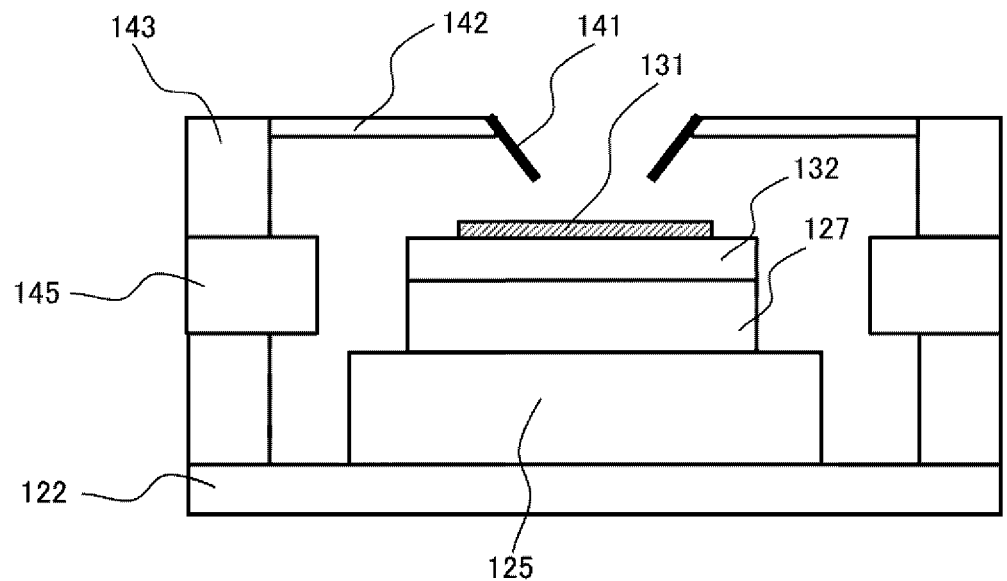
[FIG. 3]
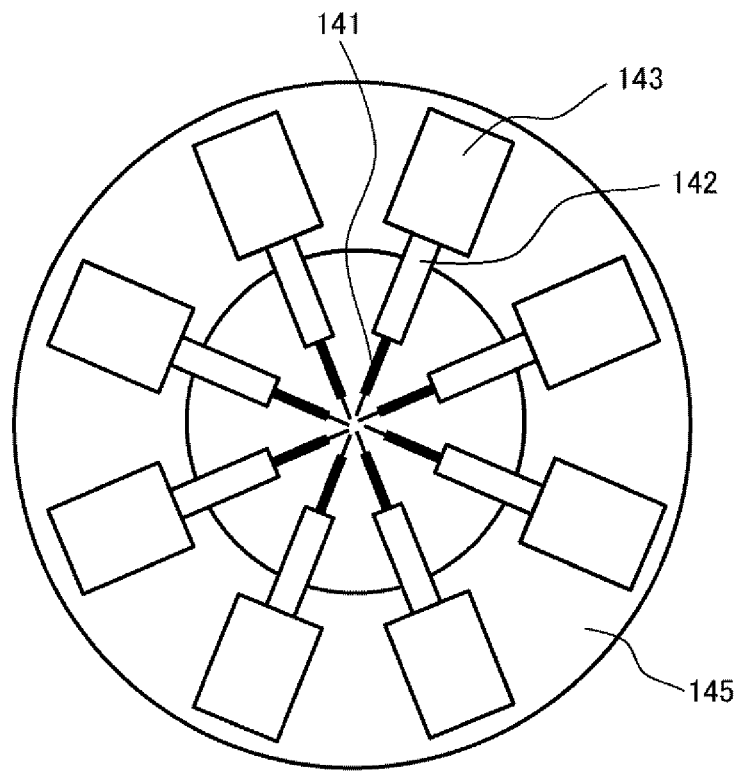

[FIG. 4]
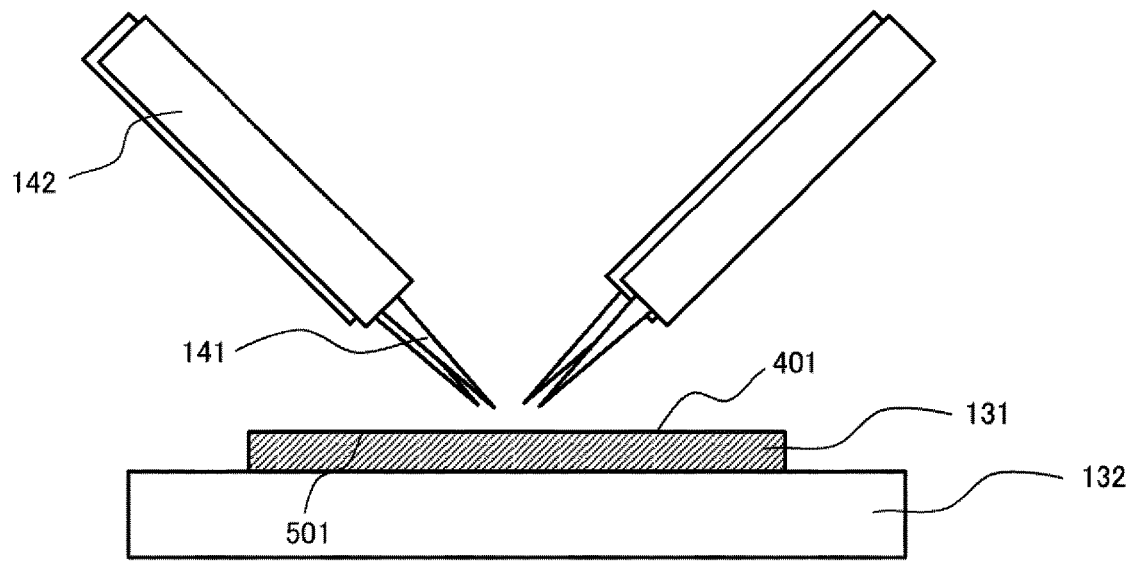
[FIG. 5]
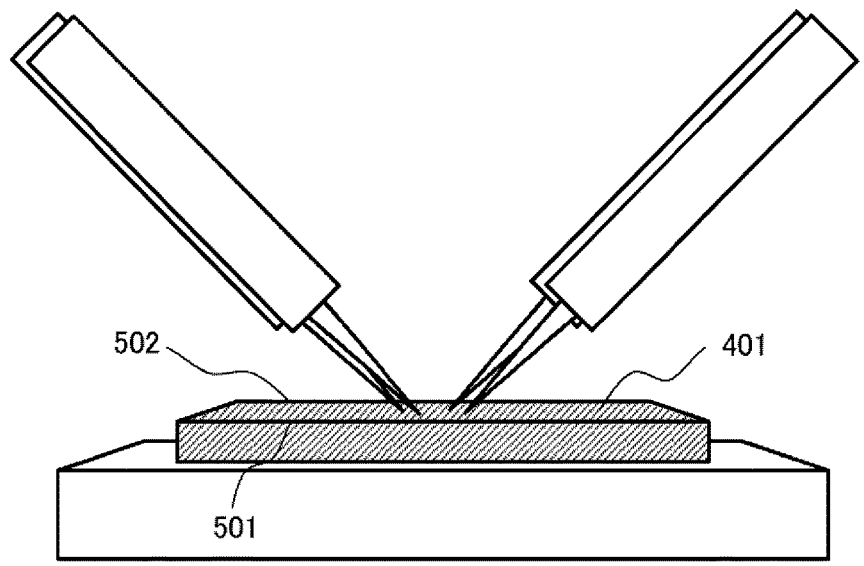

[FIG. 6]
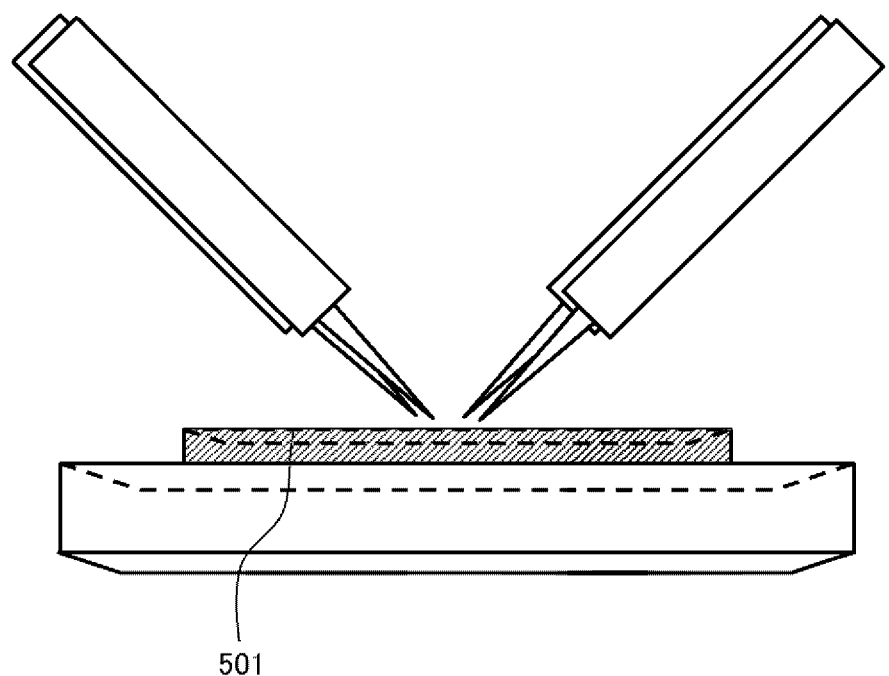

[FIG. 7]
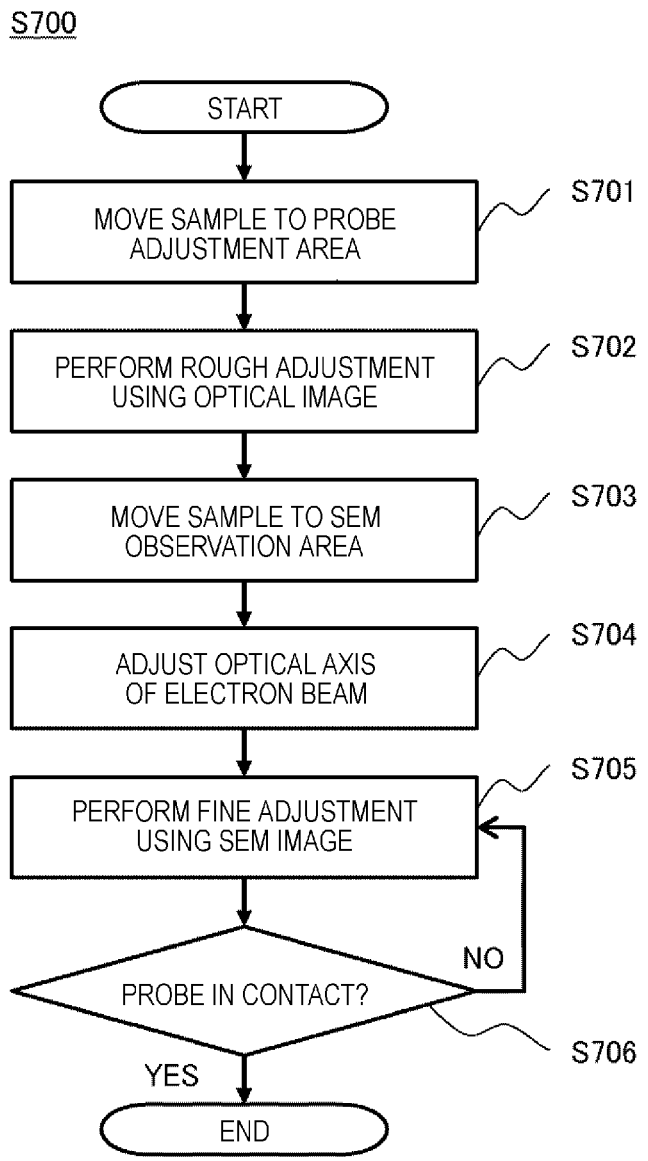

[FIG. 8]
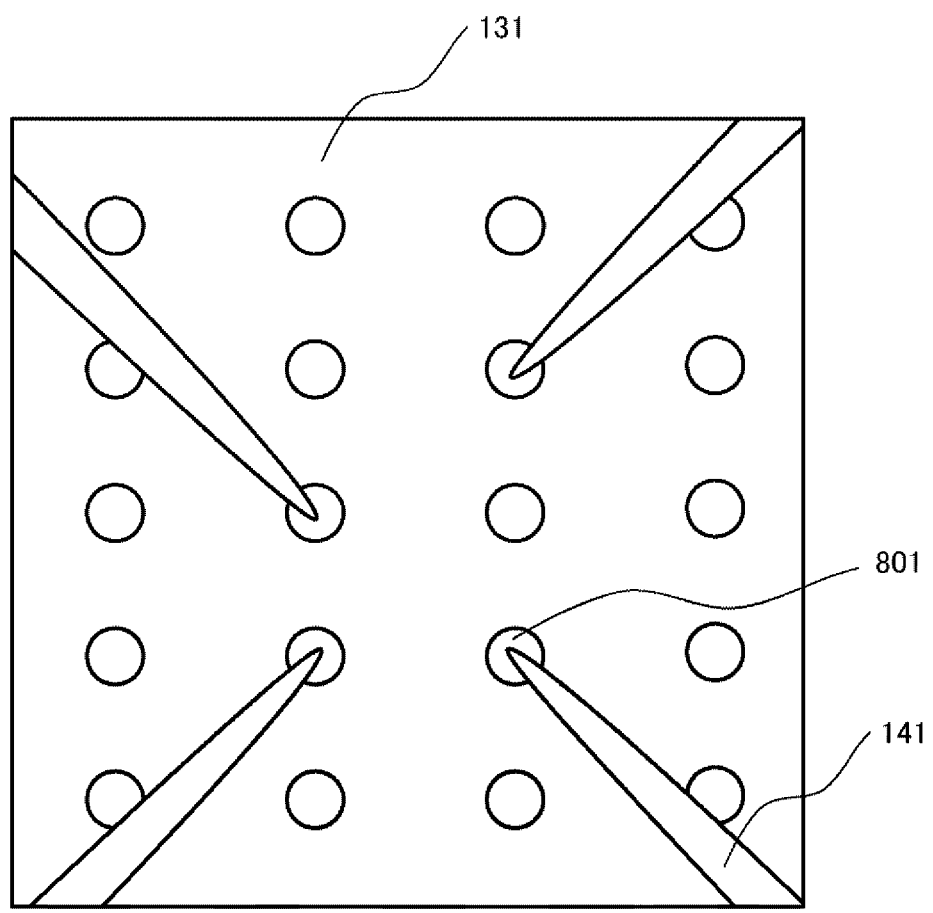

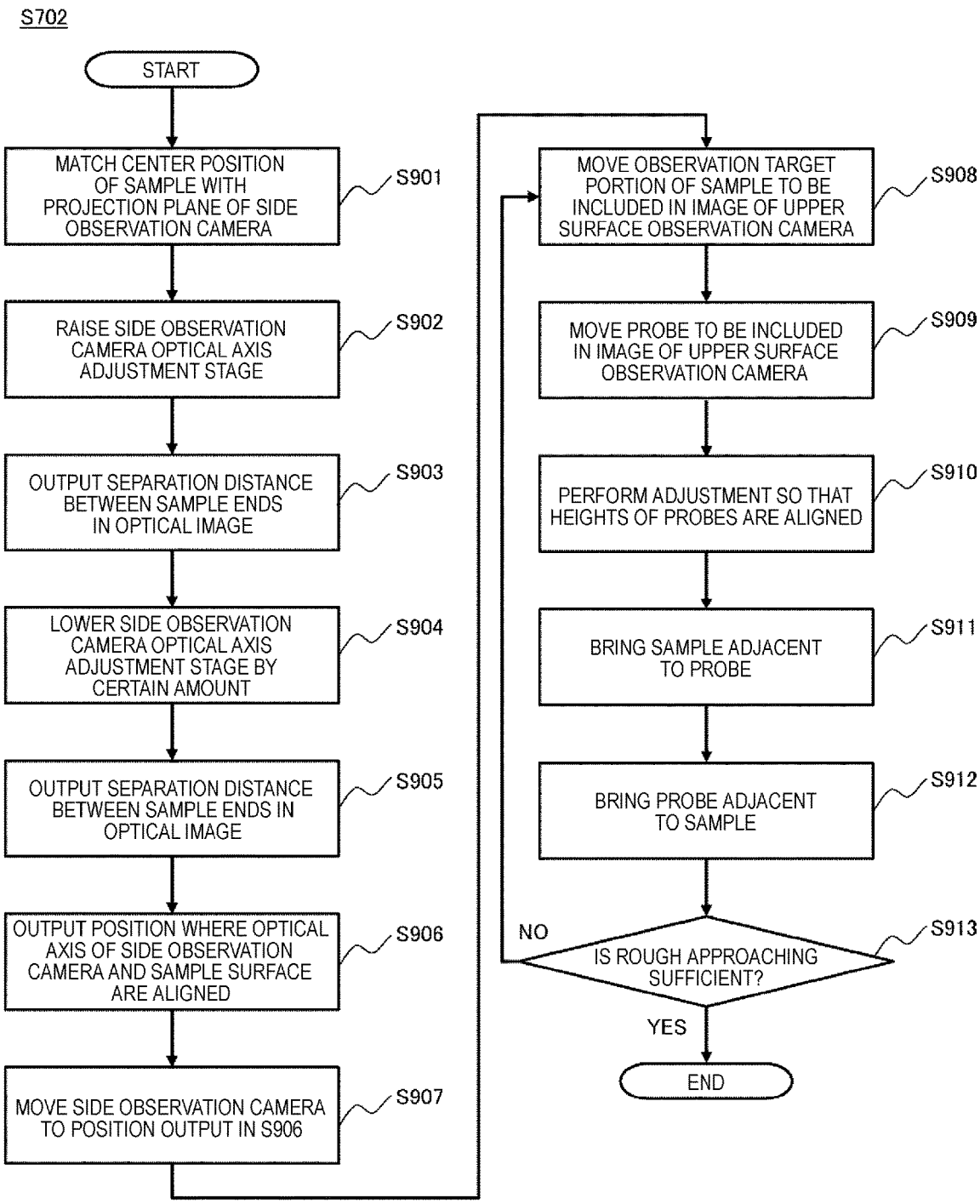
[FIG. 9]

[FIG. 10]
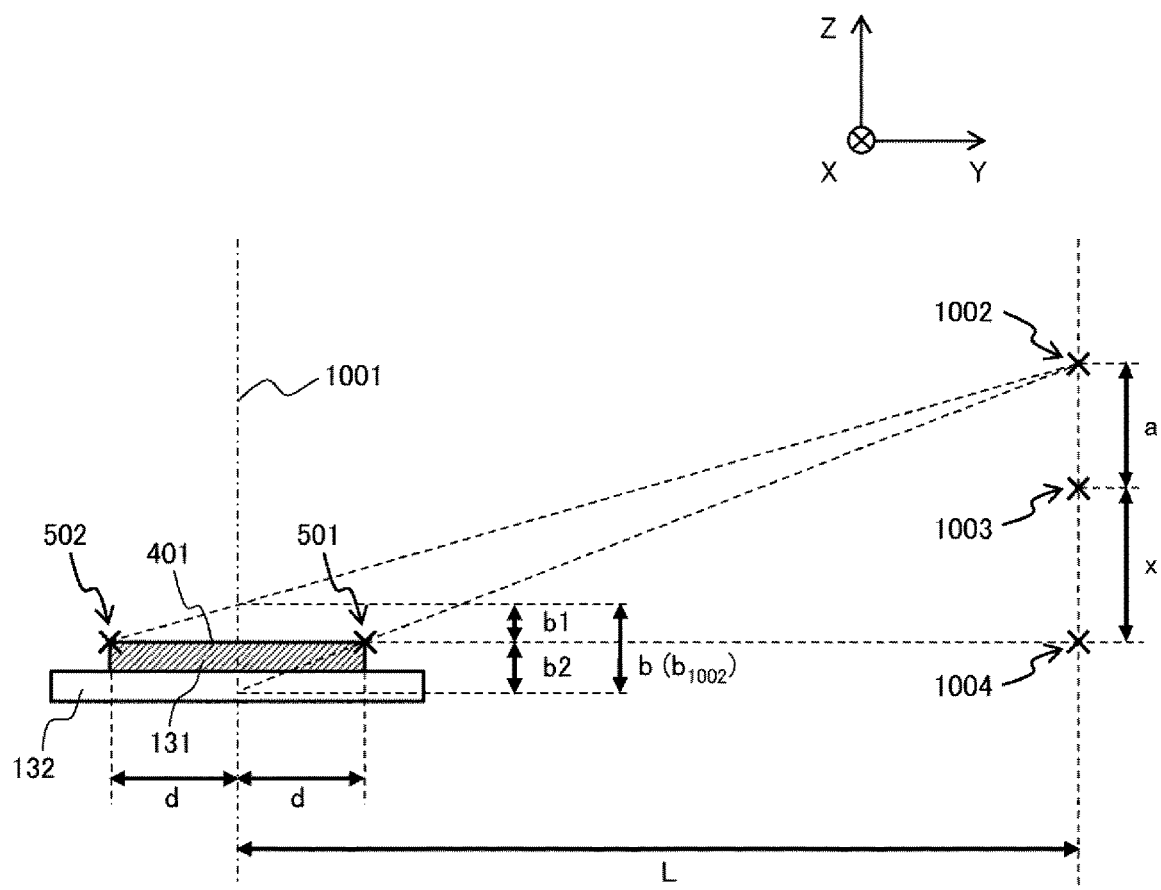

[FIG. 11]
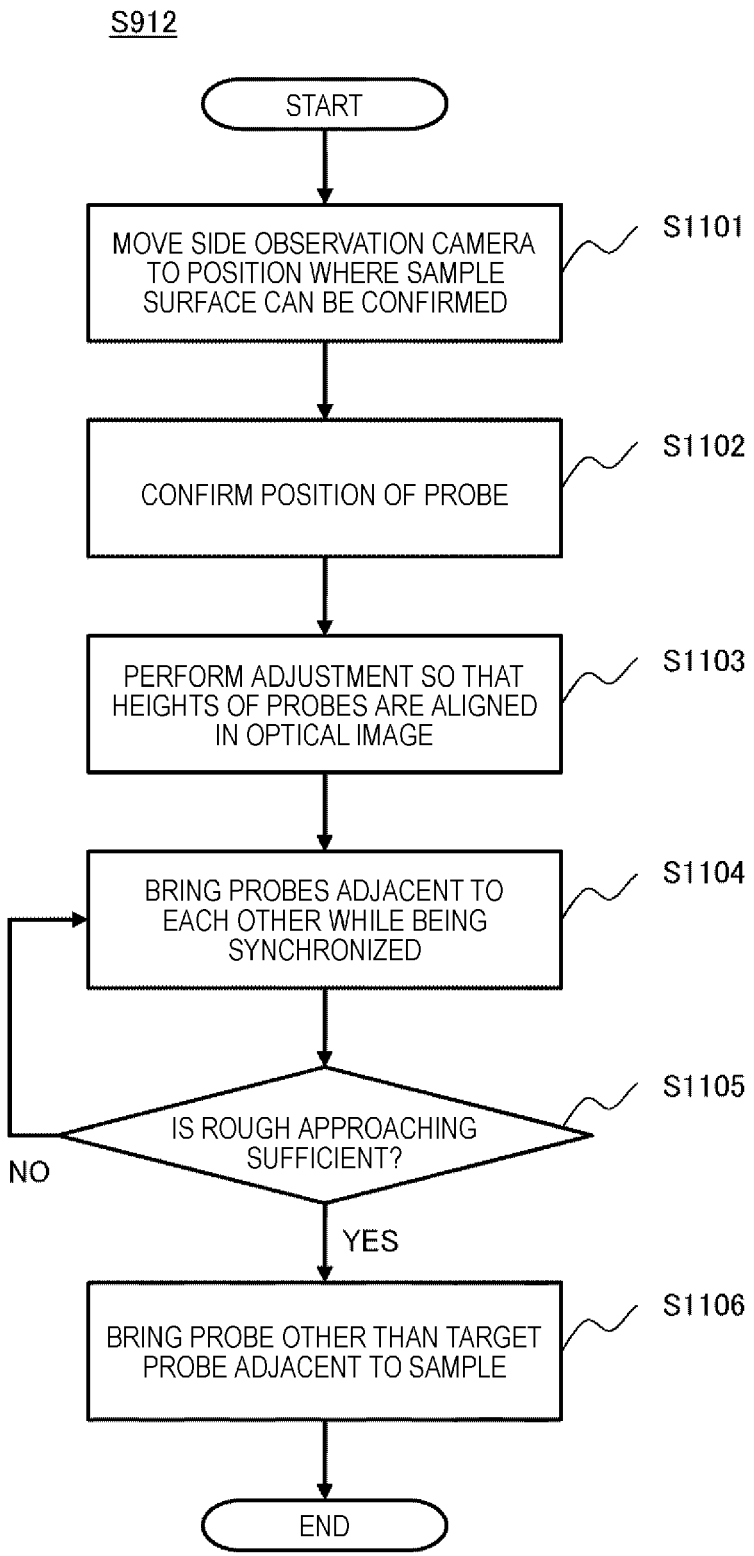

[FIG. 12]
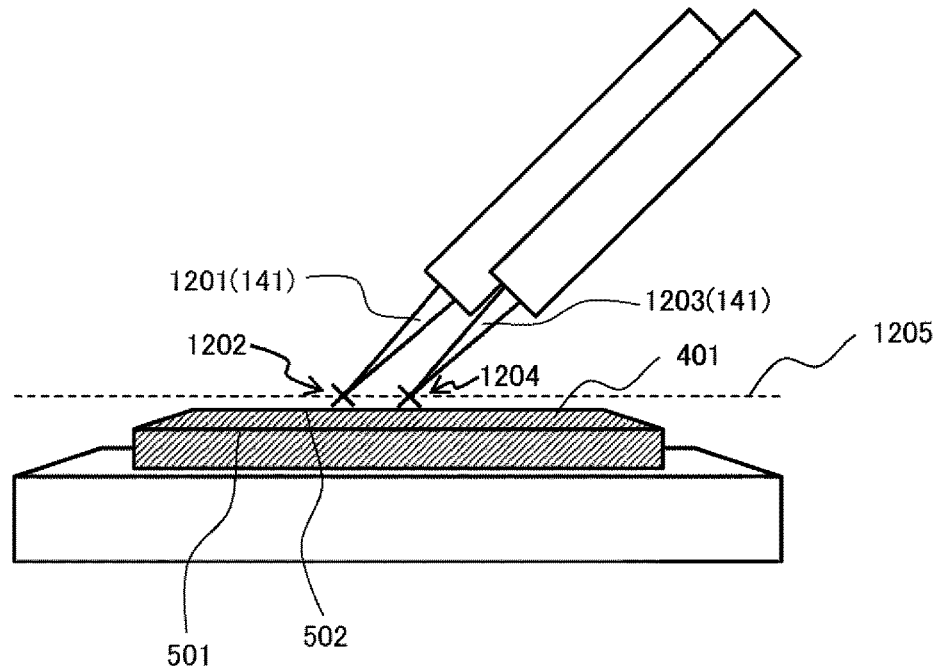
[FIG. 13]
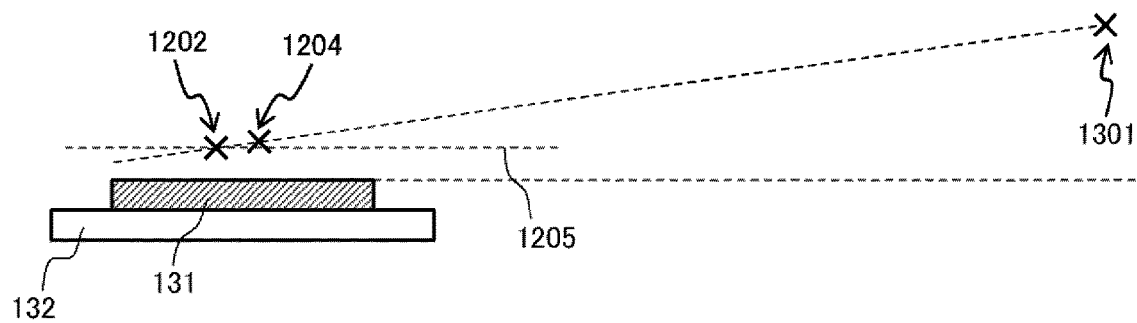

[FIG. 14]
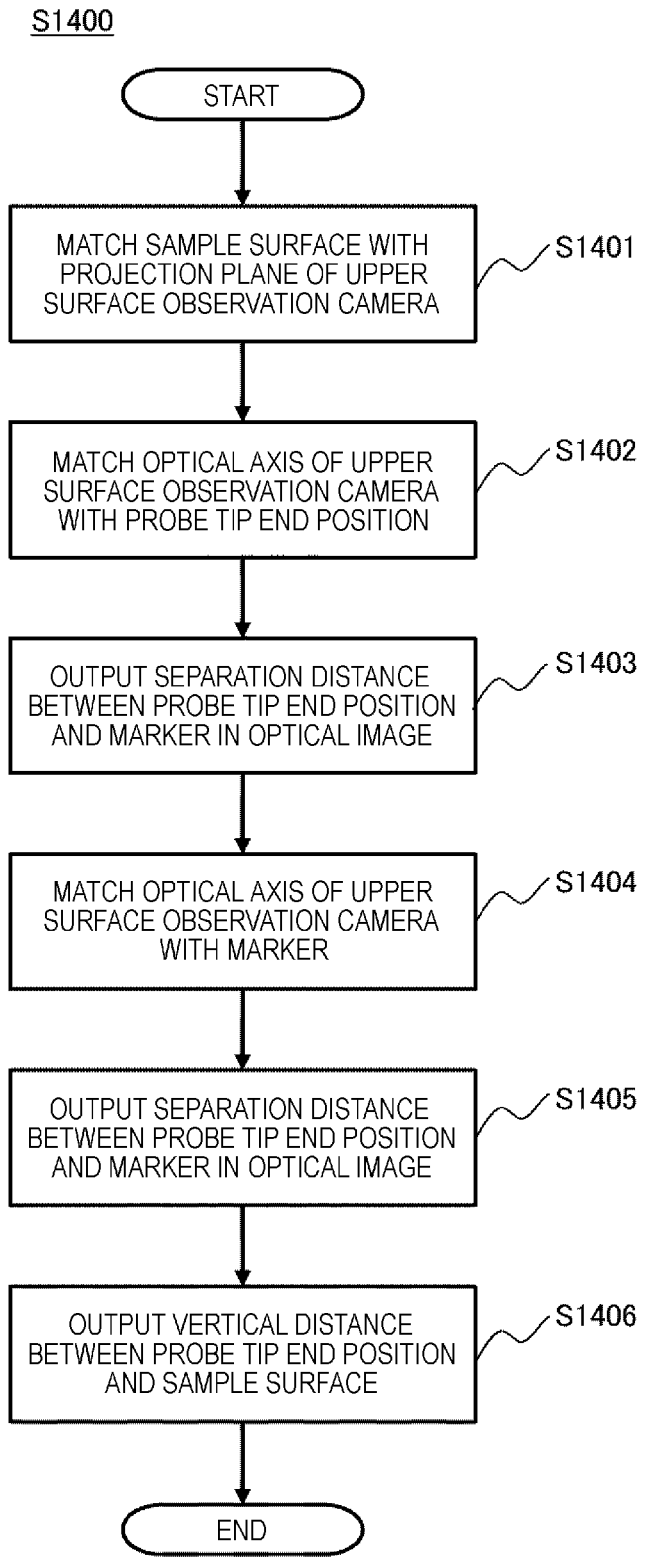

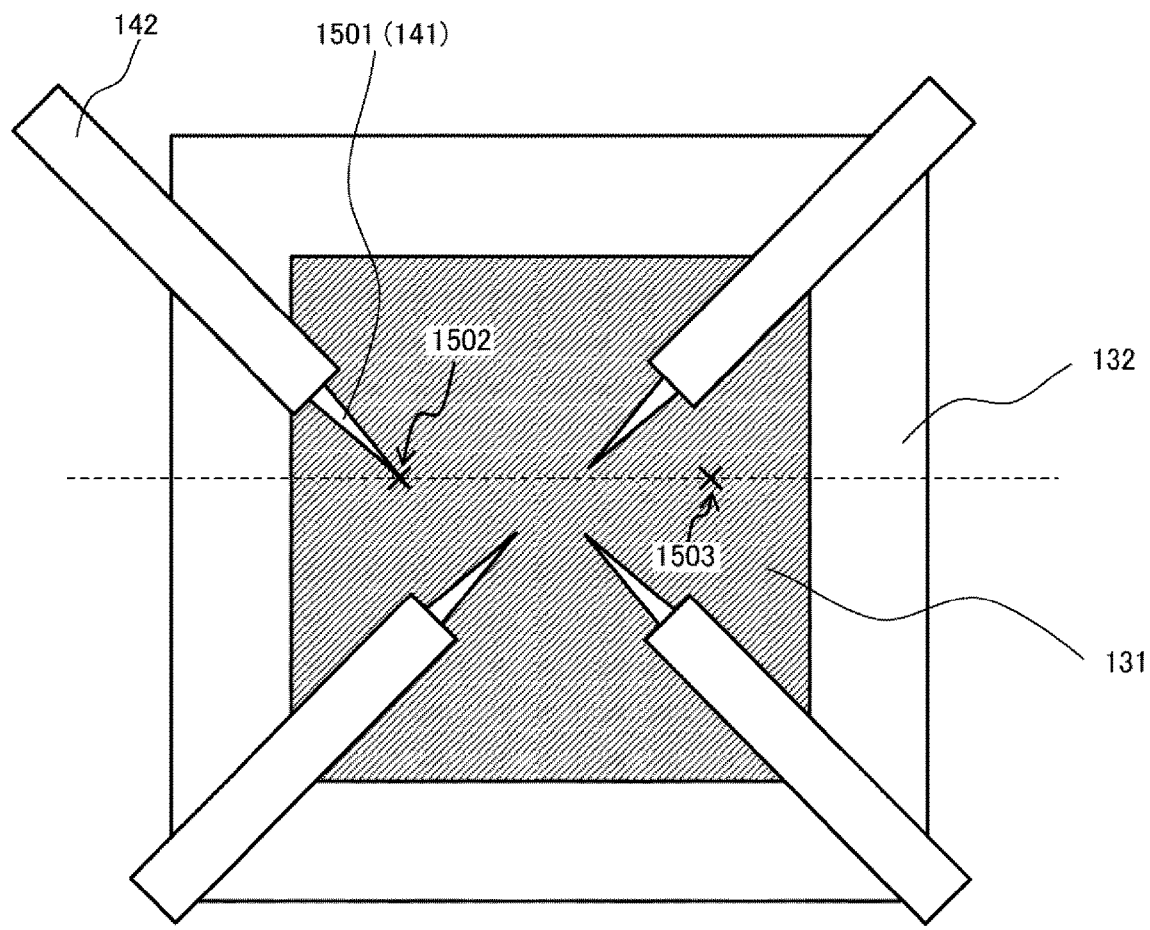
[FIG. 15]

[FIG. 16]
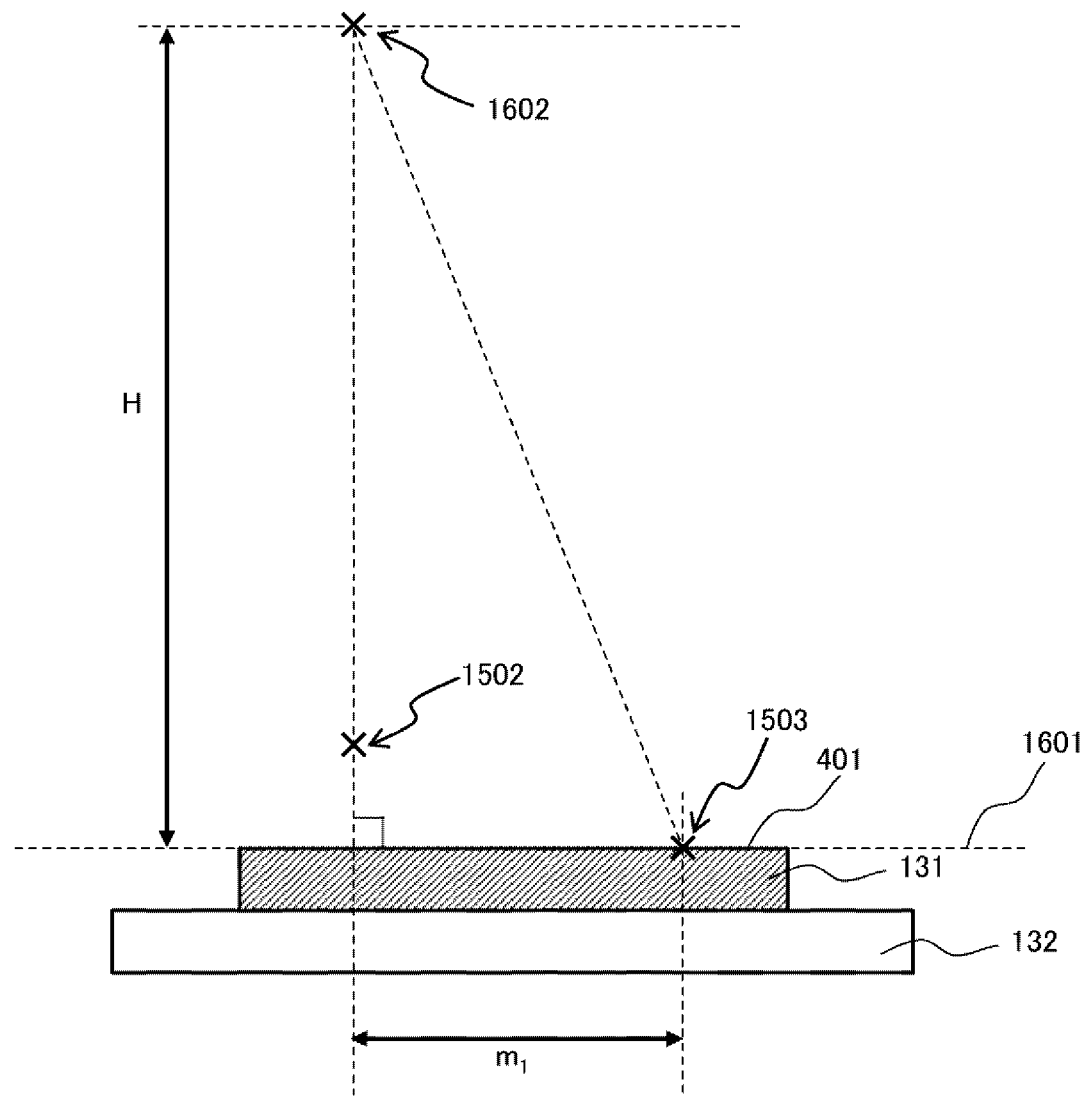

[FIG. 17]
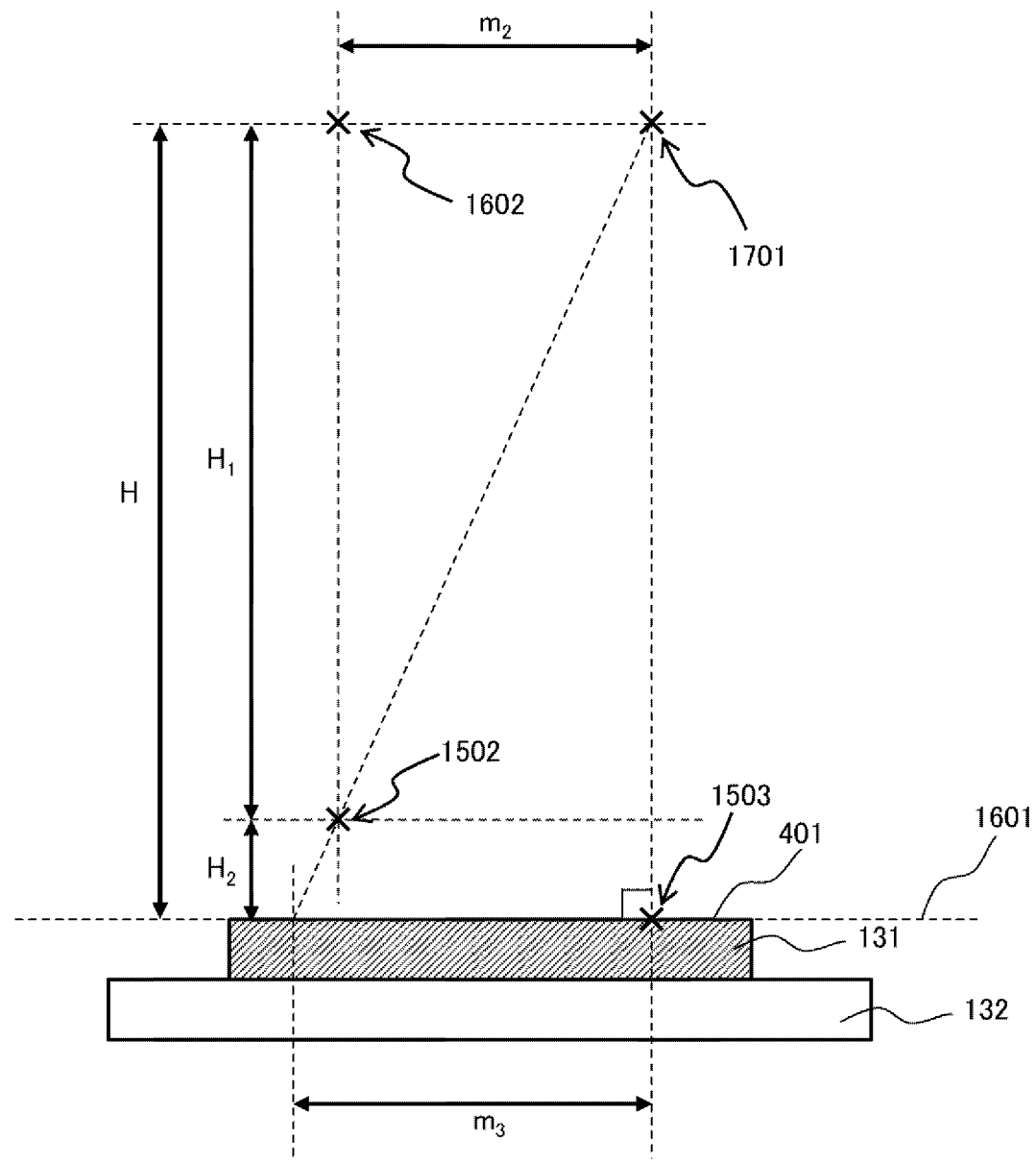

[FIG. 18]
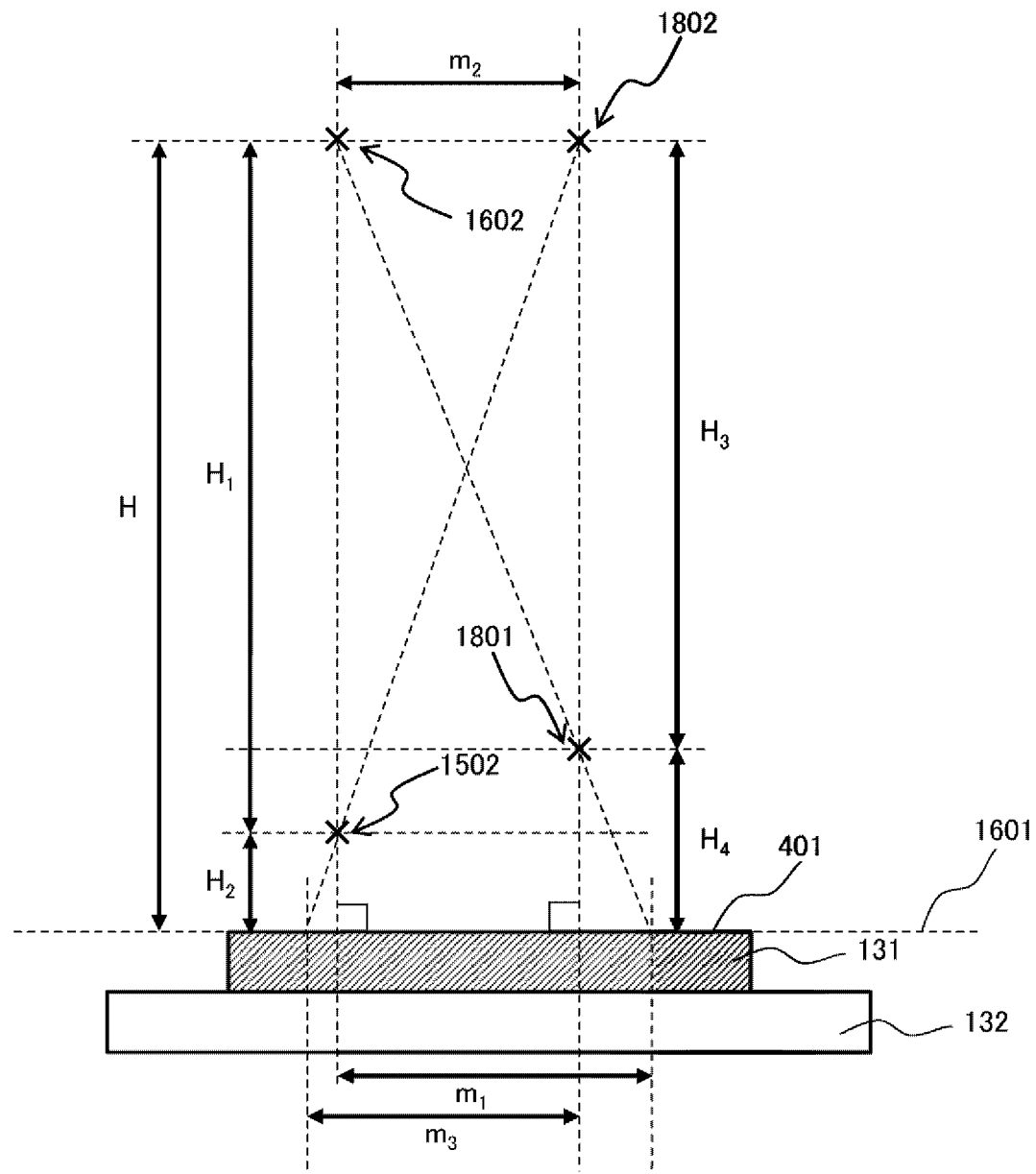

PROBE DEVICE

TECHNICAL FIELD

The present invention relates to a probe device that measures characteristics of a sample by bringing a mechanical probe into contact with the surface of the sample.

BACKGROUND ART

To detect defects in wirings of semiconductor devices which have become increasingly miniaturized and highly integrated in recent years, probe devices (defect inspection devices) that bring probes into contact (touch) with the semiconductor elements and measure electrical characteristics thereof are widely used. Probes that are made to touch desired positions (for example, electrodes of contacts, plugs, and the like) on miniaturized semiconductor elements are also miniaturized, and it is necessary to observe the tips of the probes in real time with high spatial resolution to make the probes accurately touch the desired positions on the semiconductor elements in the defect inspection devices. Therefore, a method of making a probe touch a semiconductor element by using a scanning electron microscope (SEM) is widely used.

Although SEM has high spatial resolution, it is not suitable for imaging a wide range at low magnification and has a shallow depth of focus. To improve an inspection throughput, it is desirable to speed up the approach of a probe to a sample, but it is necessary to prevent damage to the sample and the probe by making the probe land softly on the sample at the moment of touch.

PTL 1 discloses a defect inspection device in which a probe rough approaching image acquisition device for allowing a probe and a sample to approach each other by rough adjustment (rough approaching) using an optical image before the touch of the probe using SEM to rapidly perform positioning of the probe is provided in parallel with an electro-optical system device.

CITATION LIST

Patent Literature

PTL 1: JP2005-189239A

SUMMARY OF INVENTION

Technical Problem

In the defect inspection device disclosed in PTL 1, the probe rough approaching image acquisition device is fixed to a sample chamber. However, when samples differ in thickness, a positional relationship between a sample surface and an optical axis of a side observation camera differs depending on the sample, and thus the appearance of the sample surface and the tip end of the probe in the optical image differs depending on the sample. When defect inspection is performed by changing an operation distance of the SEM, the height of a sample stage on which a sample is placed is changed according to the operation distance. Thus, even with the same sample, the positional relationship between the sample surface and the optical axis of the side observation camera changes, and the appearance of the sample surface and the tip end of the probe in the optical image changes.

When the probe is inadvertently brought into contact with the sample surface, there is a concern that the probe may be damaged due to an impact. Thus, it is unavoidable that a limit originally exists to a distance at which the probe can be approached to the sample in a rough approaching stage in which the probe is approached to the sample using a low-magnification optical image. However, when there is a difference in the appearance in the optical images as described above, a separation distance between the sample and the probe cannot be accurately measured, and the probe cannot approach the sample to the limit. When the precision of rough approaching is low, a period of time required for fine position adjustment of the probe using a SEM image increases. This may reduce an inspection throughput, resulting in a concern of an increase in the amount of contamination or damage due to continued exposure of an electron beam to the sample for a longer period of time.

An object of the present invention is to provide a probe device that allows a probe to approach a sample rapidly and safely.

Solution to Problem

A probe device according to an embodiment of the present invention includes a sample stage that supports a sample, a probe unit to which a probe brought into contact with a predetermined sample surface of the sample is attached, a first camera that images the sample and the probe, and a first camera optical axis adjustment stage that adjusts an optical axis of the first camera, in which the optical axis of the first camera is parallel to the sample surface, and the first camera optical axis adjustment stage allows the optical axis of the first camera to be moved in a direction perpendicular to the sample surface.

Advantageous Effects of Invention

It is possible to improve a throughput of a touch process of a probe and reduce a period of time during which a sample and the probe are damaged by irradiation with a charged particle beam.

Other objects and novel features will become apparent from the description and accompanying drawings of the present specification.

BRIEF DESCRIPTION OF DRAWINGS

FIG. 1 is a schematic diagram of a defect inspection device.

FIG. 2 is a front view illustrating a configuration around a sample and a probe.

FIG. 3 is a plan view illustrating a configuration of the probe.

FIG. 4 illustrates an optical image when the height of an optical axis of a side observation camera is aligned with a sample surface.

FIG. 5 illustrates an optical image when the optical axis of the side observation camera is located at a position higher than the sample surface.

FIG. 6 illustrates an optical image when the optical axis of the side observation camera is located at a position lower than the sample surface.

FIG. 7 is a flowchart showing an example of a probe touch process.

FIG. 8 illustrates an example (schematic diagram) of a SEM image.

FIG. 9 is a flowchart showing an example of a rough adjustment process using an optical image.

FIG. 10 is a side view illustrating a camera position alignment method in a rough adjustment process using an optical image.

FIG. 11 is a flowchart showing an example of a proximity process for a plurality of probes.

FIG. 12 illustrates an optical image captured by a side observation camera 111A.

FIG. 13 is a side view illustrating a positional relationship between probes in step S1103 of FIG. 11.

FIG. 14 is a flowchart showing an example of a probe positional relationship acquisition process using an upper surface observation camera.

FIG. 15 illustrates an optical image captured by an upper surface observation camera 111B.

FIG. 16 is a front view illustrating a positional relationship between a probe and a marker.

FIG. 17 is a front view illustrating a positional relationship between the probe and the marker.

FIG. 18 is a front view illustrating a positional relationship between probes.

DESCRIPTION OF EMBODIMENTS

Hereinafter, an embodiment of the present invention will be described with reference to the drawings. In the drawings, common components are given the same reference numerals, and repeated descriptions will be omitted.

<Device Configuration of Defect Inspection Device>

FIG. 1 is a schematic diagram of a defect inspection device which is an example of a probe device. A defect inspection device 100 includes an electron beam column 101, an electron beam column controller 102, a charged particle detector 103, a charged particle detector controller 104, a camera 111, a camera optical axis adjustment stage 112, a camera optical axis adjustment stage controller 113, a sample chamber 121, a base stage 122, a base stage guide 123, a base stage controller 124, a sample stage 125, a sample stage controller 126, a probe 141, a probe unit 143, a probe unit controller 144, a control computer 151, an input device 152, and a display 153 as a main configuration.

The electron beam column 101 has a built-in electron optical system configured to include an electron source for generating an electron beam, a lens for focusing an electron beam, a polarizer for scanning an electron beam, and the like. The electron beam column controller 102 performs overall control required to drive the electron beam column 101. An ion beam or the like may be used instead of an electron beam, and then, a charged particle beam column having a built-in charged particle optical system corresponding to a charged particle beam used for observation is provided.

The charged particle detector 103 detects charged particles emitted from a sample 131 by irradiating the sample 131 with an electron beam generated by the electron beam column 101. The charged particle detector 103 is a detector such as a secondary electron detector, a reflection electron detector, a STEM detector, a low energy loss electron detector, or an EDX detector. A plurality of charged particle detectors 103 may be provided. The charged particle detector controller 104 performs arithmetic processing of a signal detected by the charged particle detector 103 and converts the signal into an image.

A decompression device for evacuation, such as a rotary pump, a turbomolecular pump, an ion pump, or a cryopump, is connected to the sample chamber 121 in which the sample 131 to be inspected is placed. To easily and rapidly exchange the sample 131 or the probe 141 while maintaining the degree of vacuum in the sample chamber 121, a sample exchange chamber or a probe exchange chamber may be connected.

The camera 111 is attached to the sample chamber 121 to roughly approach the probe 141 to the sample 131. The camera 111 is an imaging device such as an optical microscope, a CCD camera, or a CMOS camera. FIG. 1 illustrates a state where the sample 131 is positioned in a SEM observation area directly below the electron beam column 101 in the sample chamber 121, but the sample 131 can be moved to a probe adjustment area within the probe altogether with the base stage 122 by the base stage guide 123. In the probe adjustment area, the camera 111 performs imaging for ascertaining a positional relationship between the sample 131 and the probe 141. The camera 111 is mounted on the camera optical axis adjustment stage 112 for adjusting the optical axis of the camera 111, and the camera optical axis adjustment stage 112 is driven by the camera optical axis adjustment stage controller 113.

The defect inspection device 100 includes a side observation camera 111A and an upper surface observation camera 111B. A side observation camera optical axis adjustment stage 112A is a camera optical axis adjustment stage that allows adjustment of the optical axis of the side observation camera 111A. The optical axis of the side observation camera 111A is parallel to the horizontal plane (XY plane), and is capable of at least vertical movement (movement in a Z direction). In the present example, the optical axis of the side observation camera 111A extends in a Y direction. The upper surface observation camera optical axis adjustment stage 112B is a camera optical axis adjustment stage that allows adjustment of the optical axis of the upper surface observation camera 111B. The optical axis of the upper surface observation camera 111B extends in the direction (Z direction) and is capable of horizontal movement. Although FIG. 1 illustrates an example in which two cameras 111 are provided such that a positional relationship between the sample 131 and the probe 141 can be ascertained from two directions, only the side observation camera 111A may be configured. Here, the upper surface observation camera 111B and the upper surface observation camera optical axis adjustment stage 112B may be omitted.

The base stage 122 is driven by the base stage controller 124 and is capable of horizontal movement along the base stage guide 123. The base stage 122 is moved to the probe adjustment area of the sample chamber 121 to approach the probe 141 as much as possible to the sample 131 based on an optical image captured by the camera 111. Here, the base stage 122 is moved to the SEM observation area to bring the probe 141 into contact with the sample 131 based on an electron microscope image.

FIG. 2 is a front view illustrating a configuration around the sample 131 and the probe 141. FIG. 3 is a plan view illustrating a configuration of the probe. The sample stage 125 and the probe unit 143 are mounted on the base stage 122. The base stage 122, the sample stage 125, and the probe unit 143 each include a drive mechanism capable of minute displacement control, such as a stepping motor or a piezo motor. That is, the sample stage 125 and the probe unit 143 on the base stage 122 operate with independent drive systems.

The sample stage 125 is driven by the sample stage controller 126 and is capable of at least horizontal and vertical movement. A sample holder receiver 127 is mounted on the sample stage 125. The sample holder receiver 127 supports a sample holder 132 on which the sample 131 is placed. An insulating material may be placed between the sample stage 125 and the sample holder receiver 127 to secure the insulation of the sample 131 when evaluating electrical characteristics. The sample 131 is supported by the sample stage 125 so that the sample surface contacted by the probe 141 is parallel to the horizontal plane (XY plane).

The probe 141 is attached to the probe unit 143 via a probe holder 142. As illustrated in FIG. 3, one probe unit 143 is provided for one probe 141. The probe unit 143 is supported by a probe unit support stand 145. The probe unit 143 is driven by the probe unit controller 144 and is capable of at least horizontal movement and vertical movement.

The probe unit controller 144 drives the probe unit 143 to bring the probe 141 into contact with a desired position of the sample 131, and extracts an electrical signal detected by the probe 141. Based on the obtained electrical signal, the electrical characteristics of the sample 131 can be measured using an electrical characteristic measuring device such as a semiconductor parameter analyzer.

The control computer 151 (FIG. 1) controls overall operation of the defect inspection device 100. The input device 152 and the display 153 are connected to the control computer 151.

The input device 152 is a device through which a user inputs various instructions to the defect inspection device 100, and for example, a keyboard, a mouse, or the like can be used. The instructions include, for example, instructions such as changing irradiation conditions of an electron beam generated by the electron beam column 101 and moving the base stage 122, the sample stage 125, and the probe unit 143.

The display 153 displays a user interface and the like output by the control computer 151. The user interface is a screen that displays the control state of the defect inspection device 100 and allows the user to change the control state by inputting instructions using the input device 152. One or a plurality of displays 153 may be provided, and the display 153 may have the function of the input device 152, such as a touch panel.

The control computer 151 includes an electron beam column control unit 161, a detector signal processing unit 162, a camera image processing unit 163, a camera optical axis adjustment stage control unit 164, and a stage control unit 165. The roles of the control units and processing units will be described later. Control conditions for the control units are set by the user via a user interface screen, and images and information generated by the processing units are displayed to the user via the user interface screen.

The control computer 151 is for communicating with each of the electron beam column controller 102, the charged particle detector controller 104, the camera 111, the camera optical axis adjustment stage controller 113, the base stage controller 124, the sample stage controller 126, and the probe unit controller 144. Each control unit of the control computer 151 controls the operation of each controller to execute inspection. In the control computer 151, not only one computer may perform all control functions, but also a plurality of computers may share the control functions.

The electron beam column controller 161 controls the electron beam column controller 102. The detector signal processing unit 162 controls the charged particle detector controller 104 and outputs a SEM image (charged particle image). The camera image processing unit 163 outputs optical images captured by the side observation camera 111A and the upper surface observation camera 111B. The camera optical axis adjustment stage control unit 164 controls the camera optical axis adjustment stage controller 113 to change the positions of the side observation camera optical axis adjustment stage 112A and the upper surface observation camera optical axis adjustment stage 112B. The stage control unit 165 controls the base stage controller 124, the sample stage controller 126, and the probe unit controller 144, and changes the positions of the base stage 122, the sample stage 125, and the probe unit 143.

The detector signal processing unit 162 and the camera image processing unit 163 may analyze output images using image processing or machine learning, and may output the analysis results, for example, position information of the sample 131, the probe 141, or the camera 111, and the like.

The control conditions for the electron beam column control unit 161, the camera optical axis adjustment stage control unit 164, and the stage control unit 165 may be input by the user from the input device 152 based on images displayed on the display 153 from the detector signal processing unit 162 or the camera image processing unit 163, or may be set automatically by each control unit based on the analysis results received from the detector signal processing unit 162 or the camera image processing unit 163.

Although not illustrated in FIG. 1, the sample chamber 121 may include a sample height measurement unit therein for acquiring height information of the sample 131. The sample height measurement unit outputs the coordinate value of the height of the sample 131. The sample height measurement unit may use a SEM focus or use a laser and a sensor. The sample height measurement unit can easily estimate a movement amount of the side observation camera optical axis adjustment stage 112A by measuring a difference in height when the sample 131 is replaced or when an observation target portion of the sample 131 is changed, and thus it is possible to improve an inspection throughput.

<Probe Touch Process>

A probe touch process for bringing the probe 141 into contact with a desired position on the sample 131 will be described. FIG. 7 is a flowchart illustrating an example of a probe touch process S700 in the defect inspection device 100.

S701:

The stage control unit 165 controls the base stage controller 124 so that the sample 131 and the probe 141 enter the probe adjustment area while confirming an optical image output by the camera image processing unit 163.

S702:

The camera optical axis adjustment stage control unit 164 controls the camera optical axis adjustment stage 112 while confirming the optical image output by the camera image processing unit 163 to adjust the optical axis of the camera 111. Based on the optical image output by the camera image processing unit 163, the stage control unit 165 controls the sample stage controller 126 and the probe unit controller 144, respectively, to reduce a distance between the sample 131 and the probe 141 as much as possible. Details of the present step will be described later.

S703:

The stage control unit 165 controls the base stage controller 124 so that the sample 131 and the probe 141 enter the SEM observation area.

S704:

The electron beam column controller 161 controls the electron beam column controller 102 while confirming a signal from the detector signal processing unit 162 to adjust the optical axis of an electron beam of the electron beam column 101.

S705:

The stage control unit 165 controls the probe unit controller 144 while confirming a SEM image output by the detector signal processing unit 162 so that the sample 131 and the probe 141 approach each other. However, when the probe 141 collides with the sample 131 at high speed, there is a concern that the probe 141 will be damaged. Therefore, the stage control unit 165 performs control of reducing an approach speed as a separation distance between the sample 131 and the probe 141 decreases. The separation distance may be ascertained by confirming a shadow of the probe 141 projected onto the sample 131 or by using a difference between focal point positions of the sample 131 and the probe 141 in the SEM image.

FIG. 8 illustrates the SEM image (schematic diagram) output by the detector signal processing unit 162 in step S705. The surface of the sample 131 includes a measurement target structure 801. For example, the measurement target structure 801 is a plug, and is connected to electrodes such as a gate, a source, and a drain of a transistor formed in a lower layer of a plug formation layer. The stage control unit 165 controls the probe unit controller 144 to horizontally move each of the probes 141 so that the tip end of the probe 141 and the measurement target structure 801 overlap in the image.

S706:

The stage control unit 165 controls the probe unit controller 144 while confirming the SEM image output by the detector signal processing unit 162, lowers the probe 141, and determines whether the probe comes into contact with the objective measurement target structure 801. When the probe is in contact with the measurement target structure 801, the probe touch process S700 ends, and otherwise, step S705 is executed again.

To detect the touch of the probe 141, the behavior of the tip end of the probe 141 slidingly moving on the surface of the measurement target structure 801 after the touch may be detected from a SEM image, or the touch of the probe 141 may be detected from changes in electrical characteristics caused by the approach and touch of the probe 141 to the measurement target structure 801.

When an inspection position of the sample 131 or the sample 131 itself is changed, the probe touch process S700 is executed when the sample stage 125 is driven to perform the inspection by changing an operation distance of an electron beam by the electron beam column 101. The case where the operation distance of the electron beam is changed is, for example, a case where an accelerating voltage of the electron beam is changed. Since information included in the SEM image can be changed by changing an optical condition such as the accelerating voltage, optical conditions of the electron optical system may vary depending on the inspection.

<Rough Adjustment Process Using Optical Image>

A rough adjustment process (step S702) using an optical image will be described.

FIGS. 4 to 6 illustrate optical images captured by the side observation camera 111A. The appearance of a positional relationship between the sample 131 and the probe 141 in the optical image varies depending on the height of the optical axis of the side observation camera 111A. FIG. 4 illustrates a case where the height of the optical axis of the side observation camera 111A matches a sample surface 401, FIG. 5 illustrates a case where the optical axis of the side observation camera 111A is located at a position higher than the sample surface 401, and FIG. 6 illustrates a case where the optical axis of the side observation camera 111A is located at a position lower than the sample surface 401.

When the optical axis of the side observation camera 111A is located at a position higher than the sample surface 401 (FIG. 5), a sample end 501 of the sample 131 on a side close to the side observation camera 111A and a sample end 502 of the sample 131 on a side far from the side observation camera 111A can be confirmed in an image obtained by the side observation camera 111A. On the other hand, when the optical axis of the side observation camera 111A matches the sample surface 401 (FIG. 4) or when the optical axis is located at a lower position (FIG. 6), only the sample end 501 of the sample 131 on a side closer to the side observation camera 111A can be confirmed in the image obtained by the side observation camera 111A. In the present example, the height of the optical axis of the side observation camera 111A is adjusted based on a positional relationship between the sample end 501 and the sample end 502 in the state illustrated in FIG. 5.

FIG. 9 is a flowchart showing an example of step S702 in the probe touch process S700 (FIG. 7), that is, a rough adjustment process using an optical image. FIG. 10 is a side view illustrating a camera position alignment method in a rough adjustment process using an optical image. A projection plane of the camera is a plane located at a position apart as a focal distance from the optical center of the camera and perpendicular to the optical axis. It is assumed that effects such as lens distortion are canceled in advance by camera calibration.

S901:

The stage control unit 165 controls the base stage controller 124 so that the center position of the sample 131 matches a projection plane 1001 of the side observation camera 111A while confirming the optical image of the upper surface observation camera 111B output by the camera image processing unit 163.

S902:

The camera optical axis adjustment stage control unit 164 controls the camera optical axis adjustment stage controller 113 so that the side observation camera 111A is located at a position where the sample surface 401 can be confirmed in the optical image as illustrated in FIG. 5 while confirming the optical image of the side observation camera 111A output by the camera image processing unit 163. For example, the side observation optical axis adjustment stage 112A is controlled such that the side observation camera 111A is at the highest position or such that the sample 131 matches a reference position designated in the optical image. It is assumed that the optical center of the side observation camera 111A after completion of the control is located at an optical center position 1002 (FIG. 10).

S903:

The camera image processing unit 163 recognizes the sample end 501 and the sample end 502 of the sample 131 from the optical image of the side observation camera 111A, and outputs a separation distance between the sample end 501 and the sample end 502 in the optical image, that is, on the projection plane of the side observation camera 111A.

S904:

The camera optical axis adjustment stage control unit 164 controls the camera optical axis adjustment stage controller 113 so that the side observation camera 111A is located at a position where the sample surface 401 can be confirmed in the optical image and so that the side observation camera 111A is located at a position lowered by a certain amount from the camera position in step S902 while confirming the optical image of the side observation camera 111A output by the camera image processing unit 163. Here, a displacement a from the position of the side observation camera 111A in step S902 is output. It is assumed that the optical center of the side observation camera 111A after completion of the control is located at an optical center position 1003.

S905:

Similarly to step S903, the camera image processing unit 163 recognizes the sample end 501 and the sample end 502 of the sample 131 from the optical image of the side observation camera 111A, and outputs a separation distance between the sample end 501 and the sample end 502 in the optical image, that is, on the projection plane of the side observation camera 111A.

S906:

The camera image processing unit 163 outputs an optical center position 1004 of the side observation camera 111A when a distance between the sample end 501 and the sample end 502 of the sample 131 is set to zero, that is, when the optical axis of the side observation camera 111A and the sample surface 401 are aligned (the state illustrated in FIG. 4) based on the values output in steps S903 to S905.

FIG. 10 illustrates an optical image based on a perspective projection camera model when the optical center of the side observation camera 111A is located at the optical center position 1002. The value of a separation distance b ($b_{1002}$) between sample ends in an optical image (projection plane 1001) is calculated in step S903. Assuming that a separation distance between the projection plane 1001 and the sample end is d, a focal length of the camera is L, a separation distance between the optical center position 1003 and the optical center position 1004 is x, a distance between the sample end 501 and the sample center in the optical image is b1, and a distance between the sample end 502 and the sample center is b2, the following equations are established.

$$b = b1 + b2$$
$$b1/d = (x + a)/(L + d)$$
$$b2/d = (x + a)/(L - d)$$

Thus, when the optical center of the side observation camera 111A is at the optical center position 1002, the following equation is established.

$$b_{1002} = (x + a)\{d/(L + d) + d/(L - d)\} \quad \text{(Equation 1)}$$

Similarly, when the optical center of the side observation camera 111A is located at the optical center position 1003, the following equation is established.

$$b_{1003} = x\{d/(L + d) + d/(L - d)\} \quad \text{(Equation 2)}$$

Here, the separation distance x between the optical center position 1003 and the optical center position 1004, and the separation distance d between the sample end 501 or the sample end 502 and the projection plane 1001 are unknown, and thus the separation distance x between the optical center position 1003 and the optical center position 1004 can be calculated using two equations of (Equation 1) and (Equation 2).

The above-described calculation method is an example. For example, when the separation distance d between the sample end 501 (sample end 502) and the projection plane 1001 is already known, or when the separation distance d is measured using the optical image of the upper surface observation camera 111B which is output by the camera image processing unit 163, a separation distance between the optical center position 1002 and the optical center position 1004 can be calculated without executing steps S904 to S905.

There is a possibility that the optical axis of the side observation camera 111A, a horizontal drive surface of the sample stage 125, the upper surface of the sample holder 132, and the surface of the sample 131 will not be strictly parallel to each other as illustrated in FIG. 10 due to assembling errors or the like. Here, the influence of the errors can be considered by calculating the optical center position 1004 based on the separation distance between the sample end 501 and the sample end 502 at more than two optical center positions.

S907:

The camera optical axis adjustment stage control unit 164 controls the camera optical axis adjustment stage controller 113 so that the optical center of the side observation camera 111A matches the optical center position 1004 output in step S906. Thereby, the height of the optical axis of the side observation camera 111A is aligned with the sample surface 401, making it easier to confirm a separation distance between the tip end of the probe 141 and the sample 131 and making it easier for the probe 141 to approach the sample 131.

S908:

The stage control unit 165 controls the sample stage controller 126 so that an observation target portion of the sample 131 is included in the image while confirming the optical image of the upper surface observation camera 111B which is output by the camera image processing unit 163.

S909:

The stage control unit 165 controls the probe unit controller 144 so that the tip end of the probe 141 is located at the observation target portion of the sample 131 while confirming the optical image of the upper surface observation camera 111B which is output by the camera image processing unit 163.

S910:

To keep the separation distances between the plurality of probes 141 and the sample 131 constant, the stage control unit 165 controls the probe unit controller 144 so that the heights of the plurality of probes 141 in the optical image are aligned uniformly while confirming the optical image of the side observation camera 111A which is output by the camera image processing unit 163.

S911:

The stage control unit 165 controls the sample stage controller 126 so that the sample 131 approaches the probe 141 while confirming the optical image of the side observation camera 111A which is output by the camera image processing unit 163. Here, the camera optical axis adjustment stage control unit 164 controls the camera optical axis adjustment stage controller 113 so that the optical axis of the side observation camera 111A moves in association with the movement of the sample surface 401.

S912:

The stage control unit 165 controls the probe unit controller 144 so that the probe 141 approaches the sample 131 while confirming the optical image of the side observation camera 111A which is output by the camera image processing unit 163.

S913:

The camera image processing unit 163 determines whether the probe 141 and the sample 131 sufficiently approached each other. When rough approaching therebetween is achieved sufficiently, the rough adjustment process S702 using the optical image ends. When rough approaching therebetween is not achieved sufficiently, steps S908 to S912 are executed again.

Steps S901 to S907 for aligning the height of the optical axis of the side observation camera 111A with the sample surface 401 may be repeatedly executed at any timing as necessary.

Instead of steps S901 to S907, the camera optical axis adjustment stage control unit 164 may control the side observation camera optical axis adjustment stage 112A to stop the side observation camera 111A at a position where the sample end 501 and the sample end 502 in the optical image overlap each other when the optical center is lowered while confirming the optical image of the side observation camera 111A which is output by the camera image processing unit 163 from a state where the sample surface 401 can be confirmed in the optical image (FIG. 5).

When the defect inspection device 100 includes the sample height measurement unit described above, the side observation camera optical axis adjustment stage 112A may be controlled based on height information obtained by the sample height measurement unit instead of steps S901 to S907.

In the present example, the side observation camera optical axis adjustment stage 112A is used to align the height of the optical axis of the side observation camera 111A with the sample surface. On the other hand, it is also conceivable to fix the side observation camera 111A to the sample chamber 121 and to configure the base stage 122 to be movable not only horizontally but also vertically. However, as described above, since the probe 141 is a minute member, it is necessary to be able to move the base stage 122 up and down without applying large vibrations and the like while the probe 141 and the sample 131 are approaching each other, and it is difficult to be implemented in reality. On the other hand, in the present example, there is an advantage in that a positional relationship between the sample 131 and the probe 141 in the optical image can be adjusted without moving the sample 131 and the probe 141 by using the side observation camera optical axis adjustment stage 112A.

<Proximity Process of Plurality of Probes>

A proximity process (step S912) of a plurality of probes will be described with reference to FIGS. 11 to 13. FIG. 11 is a flowchart showing an example of the proximity process S912 of the plurality of probes. FIG. 12 illustrates an optical image captured by the side observation camera 111A. A positional relationship between the probes here shows a state after adjustment in step S1103. FIG. 13 is a side view illustrating a positional relationship between the probes in step S1103. Although only two probes are illustrated in FIGS. 12 and 13 to simplify the drawings, the plurality of probes 141 brought into contact with the sample are probes to be controlled in the present process.

S1101:

The camera optical axis adjustment stage control unit 164 controls the camera optical axis adjustment stage controller 113 so that the side observation camera 111A is located at a position where the sample surface 401 can be confirmed in the optical image as illustrated in FIG. 5 while confirming the optical image of the side observation camera 111A which is output by the camera image processing unit 163. The optical center of the side observation camera 111A after completion of the control is assumed to be located at an optical center position 1301 (FIG. 13) higher than the sample surface.

S1102:

The camera image processing unit 163 confirms a probe 1201 that is farthest from the side observation camera 111A and its probe tip end position 1202, and the other probe 1203 and its probe tip end position 1204 from the optical images of the side observation camera 111A and the upper surface observation camera 111B, and outputs position coordinates.

S1103:

The stage control unit 165 controls the probe unit controller 144 so that the heights of the probe tip end position 1202 and the probe tip end position 1204 are aligned with a reference height 1205 in the optical image while confirming the optical image of the side observation camera 111A which is output by the camera image processing unit 163.

Before the probe is lowered in the next step S1104, the camera optical axis adjustment stage control unit 164 may control the camera optical axis adjustment stage 112A to align the height of the optical axis of the side observation camera 111A with the height of the sample surface 401 or may maintain the height of the optical axis of the side observation camera 111A at a position higher than the sample surface 401 in step S1101. When the height of the optical axis of the side observation camera 111A is aligned with the height of the sample surface 401, a separation distance between the probe tip end position and the sample can be confirmed more accurately, and thus the probe further approaches the sample.

S1104:

The stage control unit 165 controls the probe unit controller 144 so that the probe 1201 approaches the sample 131 while confirming the optical image of the side observation camera 111A which is output by the camera image processing unit 163. Here, the stage control unit 165 also controls the probe 1203 in synchronization with the control of the probe 1201 so that the probe 1203 is also lowered by the same amount as the amount of lowering of the probe 1201.

As illustrated in FIG. 13, since the probe 141 that first comes into contact with the sample 131 is the probe 1201 that is farthest from the side observation camera 111A, the risk of the other probe 1203 colliding with the sample surface 401 can be reduced. Since the plurality of probes 141 can approach the sample 131 at the same time, a throughput of the process can be improved.

S1105:

The camera image processing unit 163 determines whether the probe 1201 and the sample 131 sufficiently approached each other based on the optical image of the side observation camera 111A. When rough approaching therebetween is achieved sufficiently, the process proceeds to step S1106. When rough approaching therebetween is not achieved sufficiently, step S1104 is executed again.

S1106:

The stage control unit 165 controls the probe unit controller 144 so that the probe 1203 approaches the sample 131 while confirming the optical image of the side observation camera 111A which is output by the camera image processing unit 163.

When there are a plurality of probes 141 to be brought into contact with the sample to be controlled, the probe 141 that is farthest from the side observation camera 111A is selected from among the probes 141 for which proximity control (step S1104) is not completed, and steps S1102 to S1105 may be repeatedly executed.

<Probe Positional Relationship Acquisition Process Using Upper Surface Observation Camera>

A probe positional relationship acquisition process using the upper surface observation camera will be described with reference to FIGS. 14 to 17. The same method can be applied, for example, in step S912 in the rough adjustment process (FIG. 9) using an optical image so that the probe 141 approaches the sample 131.

FIG. 14 is a flowchart illustrating an example of the probe positional relationship acquisition process using the upper surface observation camera. FIG. 15 illustrates an optical image captured by the upper surface observation camera 111B, FIG. 16 is a front view illustrating a positional relationship between a probe 1501 and a marker 1503 in steps S1402 to S1403, and FIG. 17 is a front view illustrating a positional relationship between the probe 1501 and the marker 1503 in steps S1404 to S1405. The marker 1503 is a unique structure or a dedicated mark on the sample surface 401 that can be confirmed in an optical image, or may be a foreign object or the like attached to the sample surface 401. A projection plane of the camera is a plane located at a position apart as a focal distance from the optical center of the camera and perpendicular to the optical axis. It is assumed that effects such as lens distortion are canceled in advance by camera calibration.

S1401:

The stage control unit 165 controls the sample stage controller 126 so that a projection plane 1601 of the upper surface observation camera 111B matches the sample surface 401 while confirming the optical image of the upper surface observation camera 111B which is output by the camera image processing unit 163. When the upper surface observation camera optical axis adjustment stage 112B is vertically movable, the camera optical axis adjustment stage control unit 164 may control the camera optical axis adjustment stage controller 113 so that the projection plane 1601 of the upper surface observation camera 111B matches the sample surface 401.

In the subsequent steps, the upper surface observation camera 111B performs control in a plane parallel to the sample surface 401. Thus, in the subsequent steps, the projection plane 1601 and the sample plane 401 match each other.

S1402:

The camera optical axis adjustment stage control unit 164 controls the camera optical axis adjustment stage controller 113 so that the optical axis of the upper surface observation camera 111B and the probe tip end position 1502 of the probe 1501 match each other in the optical image while confirming the optical image of the upper surface observation camera 111B which is output by the camera image processing unit 163. The optical center of the upper surface observation camera 111B after completion of the control is located at an optical center position 1602 (FIG. 16).

S1403:

The camera image processing unit 163 outputs a separation distance $m_1$ between the probe tip end position 1502 and the marker 1503 in the optical image, that is, on the projection plane of the upper surface observation camera 111B from the optical image of the upper surface observation camera 111B.

S1404:

The camera optical axis adjustment stage control unit 164 controls the camera optical axis adjustment stage controller 113 so that the optical axis of the upper surface observation camera 111B and the marker 1503 match each other in the optical image while confirming the optical image of the upper surface observation camera 111B which is output by the camera image processing unit 163. The optical center of the upper surface observation camera 111B after completion of the control is located at an optical center position 1701 (FIG. 17). The camera optical axis adjustment stage control unit 164 outputs a movement amount $m_2$ of the optical axis of the upper surface observation camera 111B from step S1402.

S1405:

The camera image processing unit 163 outputs a separation distance $m_3$ between the probe tip end position 1502 and the marker 1503 in the optical image, that is, on the projection plane of the upper surface observation camera 111B from the optical image of the upper surface observation camera 111B.

S1406:

The camera image processing unit 163 outputs a distance (vertical distance) in a direction perpendicular to the sample surface 401 of the probe tip end position 1502 based on the values output in steps S1403 and S1405.

FIG. 17 illustrates an optical image based on a perspective projection camera model when the optical center of the upper surface observation camera 111B is located at the optical center position 1701. Assuming that a distance (vertical distance) in a direction perpendicular to the sample surface 401 at the probe tip end position 1502 is $H_2$ and a focal length of the camera is H, the following equations are established.

$$m_2 = m_1$$
$$H_1 = H*(m_2/m_3) = H*(m_1/m_3)$$
$$H_2 = H - H_1 = H*(1 - m_2/m_3) = H*(1 - m_1/m_3)$$

Rough approaching of the probe 1501 may be executed based on the vertical distance between the probe tip end position 1502 and the sample surface 401 which is output in step S1406, or absolute position coordinates of the probe tip end position 1502 or the marker 1503 may be calculated.

As shown in the above equations, the separation distance $m_1$ calculated in step S1403 is equal to the movement amount $m_2$ of the optical axis of the upper surface observation camera 111B which is output in step S1404. Therefore, the movement amount $m_2$ may be used without obtaining the separation distance $m_1$ from the optical image.

Although a case where the probe tip end position 1502 and the marker 1503 are located on a horizontal line (indicated by a dashed line in FIG. 15) in the optical image of the upper surface observation camera 111B was described above, a straight line connecting two points may face any direction.

Instead of setting the marker 1503 on the sample surface 401, a vertical distance between the probe 1501 and a tip end position of each probe may be output using a tip end position of another probe 141. FIG. 18 is a front view illustrating a positional relationship between the tip end positions 1502 and 1801 of the two probes. The marker 1503 is replaced with the probe tip end position 1801, and the flow of FIG. 14 is executed. The optical center of the upper surface observation camera 111B when the optical axis of the upper surface observation camera 111B matches the probe tip end position 1801 in the optical image is located at an optical center position 1802 (FIG. 18). When a distance (vertical distance) in a direction perpendicular to the sample surface 401 of the probe tip end position 1801 is H₄, the following relationship is established.

$$H_1 = H * (m_2/m_3)$$
$$H_2 = H - H_1 = H * (1 - m_2/m_3)$$
$$H_3 = H * (m_2/m_1)$$
$$H_4 = H - H_3 = H * (1 - m_2/m_1)$$

As can be seen from FIG. 18, the values of $m_1$ and $m_2$ are not equal to each other here.

In step S1401, apart from the marker 1503, another marker is set on the sample surface 401, and determination for match can be performed assuming that the projection plane 1601 of the upper surface observation camera 111B and the sample surface 401 match each other when a separation distance $m_a$ between the markers on the optical image matches a separation distance $m_\beta$ between the optical centers of the upper surface observation camera 111B when the optical axis of the upper surface observation camera 111B and each marker match each other in the optical image.

Also in the present flow, the upper surface observation camera optical axis adjustment stage 112B is used to move the optical axis of the upper surface observation camera 111B to the tip end position of the marker or the probe. On the other hand, a flow in which the upper surface observation camera 111B is fixed to the sample chamber 121, and the stage control unit 165 controls the sample stage controller 126 to move the marker 1503 or the stage control unit 165 controls the probe unit controller 144 to move the probe tip end position 1502 is also conceivable. Alternatively, a flow in which the stage control unit 165 controls the base stage controller 124 to horizontally move the base stage 122 is also conceivable. However, in either case, there is a concern that the sample surface 401 and the probe 141 may collide with each other when approaching each other, causing damage to the sample 131 or the probe 141. On the other hand, in the present flow, there is an advantage in that the position of the optical axis in the optical image can be adjusted without moving the sample 131 and the probe 141 by using the upper surface observation camera optical axis adjustment stage 112B.

REFERENCE SIGNS LIST

- 101: electron beam column
- 102: electron beam column controller
- 103: charged particle detector
- 104: charged particle detector controller
- 111: camera
- 111A: side observation camera
- 111B: upper surface observation camera
- 112: camera optical axis adjustment stage
- 112A: side observation camera optical axis adjustment stage
- 112B: upper surface observation camera optical axis adjustment stage
- 113: camera optical axis adjustment stage controller
- 121: sample chamber
- 122: base stage
- 123: base stage guide
- 124: base stage controller
- 125: sample stage
- 126: sample stage controller
- 127: sample holder receiver
- 131: sample
- 132: sample holder
- 141, 1201, 1203, 1501: probe
- 142: probe holder
- 143: probe unit
- 144: probe unit controller
- 145: probe unit support stand
- 151: control computer
- 152: input device
- 153: display
- 161: electron beam column control unit
- 162: detector signal processing unit
- 163: camera image processing unit
- 164: camera optical axis adjustment stage control unit
- 165: stage control unit
- 401: sample surface
- 501, 502: sample end
- 801: measurement target structure
- 1001, 1601: projection plane
- 1002, 1003, 1004, 1301, 1602, 1701, 1802: optical center position
- 1202, 1204, 1502, 1801: probe tip end position
- 1205: reference height
- 1503: marker

The invention claimed is:

1. A probe device comprising:
    a sample stage that supports a sample;
    a probe unit to which a probe brought into contact with a predetermined sample surface of the sample is attached;
    a first camera that images the sample and the probe; and
    a first camera optical axis adjustment stage that adjusts an optical axis of the first camera, wherein
    the optical axis of the first camera is parallel to the sample surface, and
    the first camera optical axis adjustment stage allows the optical axis of the first camera to be moved in a direction perpendicular to the sample surface.

2. The probe device according to claim 1, further comprising:
    a stage control unit that controls the sample stage and the probe unit, wherein
    the stage control unit controls the sample stage or the probe unit so that the probe approaches a predetermined position on the sample surface based on an optical image of the first camera while a height of the optical axis of the first camera is aligned with a height of the sample surface.

3. The probe device according to claim 2, further comprising:
    a camera image processing unit that outputs an optical image captured by the first camera; and
    a camera optical axis adjustment stage control unit that controls the first camera optical axis adjustment stage based on the optical image of the first camera.

4. The probe device according to claim 3, wherein
    the camera optical axis adjustment stage control unit controls the first camera optical axis adjustment stage so that the optical axis of the first camera is at a position higher than the sample surface,
    the camera image processing unit calculates a separation distance between a first sample end of the sample on a side close to the first camera and a second sample end of the sample on a side far from the first camera on a projection plane of the first camera from the optical image of the first camera while the optical axis of the first camera is located at a position higher than the sample surface, and the camera optical axis adjustment stage control unit controls the first camera optical axis adjustment stage so that the height of the optical axis of the first camera is aligned with the height of the sample surface, based on the separation distance between the first sample end and the second sample end of the sample.

5. The probe device according to claim 3, further comprising:

a plurality of the probe units, wherein the camera optical axis adjustment stage control unit controls the first camera optical axis adjustment stage so that the optical axis of the first camera is at a position higher than the sample surface, the stage control unit controls the plurality of probe units so that tip ends of the probes attached to the plurality of probe units are aligned in the optical image of the first camera while the optical axis of the first camera is at a position higher than the sample surface, and the stage control unit controls a probe unit to which a probe, which is farthest from the first camera among the plurality of probes, is attached such that the probe approaches the sample surface based on the optical image of the first camera, and controls a probe unit to which another probe is attached such that the other probe approaches the sample surface in synchronization with the probe farthest from the first camera.

6. The probe device according to claim 3, further comprising:

a second camera that images the sample and the probe; and a second camera optical axis adjustment stage that adjusts an optical axis of the second camera, wherein the optical axis of the second camera is perpendicular to the sample surface, the second camera optical axis adjustment stage allows the optical axis of the second camera to be moved within a plane parallel to the sample surface, the camera image processing unit outputs an optical image captured by the second camera, and the camera optical axis adjustment stage control unit controls the second camera optical axis adjustment stage of based on the optical image of the second camera.

7. The probe device according to claim 6, wherein the stage control unit controls the sample stage so that a projection plane of the second camera matches the sample surface, the camera optical axis adjustment stage control unit controls the second camera optical axis adjustment stage so that the optical axis of the second camera and the tip end of the probe match each other, the camera a image processing unit calculates a first separation distance between the tip end of the probe and a marker on the sample surface on the projection plane of the second camera from the optical image of the second camera while the optical axis of the second camera and the tip end of the probe match each other, the camera optical axis adjustment stage control unit controls the second camera optical axis adjustment stage so that the optical axis of the second camera and the marker match each other, the camera image processing unit calculates a second separation distance between the tip end of the probe and the marker on the projection plane of the second camera from the optical image of the second camera while the optical axis of the second camera and the marker match each other, and the camera image processing unit calculates a vertical distance between the tip end of the probe and the sample surface based on the first separation distance and the second separation distance.

8. The probe device according to claim 6, wherein the stage control unit controls the sample stage so that the projection plane of the second camera matches the sample surface, the camera optical axis adjustment stage control unit controls the second camera optical axis adjustment stage so that the optical axis of the second camera and the tip end of the probe match each other, then controls the second camera optical axis adjustment stage so that the optical axis of the second camera and the marker on the sample surface match each other, and outputs a movement amount of the optical axis of the second camera, the camera image processing unit calculates a separation distance between the tip end of the probe and the marker on the projection plane of the second camera from the optical image of the second camera while the optical axis of the second camera and the marker match each other, and the camera image processing unit calculates a vertical distance between the tip end of the probe and the sample surface based on the movement amount of the optical axis of the second camera and the separation distance.

9. The probe device according to claim 8, wherein the marker is a unique structure or a mark on the sample surface which is able to be confirmed in the optical image of the second camera, or a foreign object attached to the sample surface.

10. The probe device according to claim 6, further comprising:

a plurality of the probe units, wherein the probe units include a probe unit to which a first probe is attached and a probe unit to which a second probe is attached, the stage control unit controls the sample stage so that the projection plane of the second camera matches the sample surface, the camera optical axis adjustment stage control unit controls the second camera optical axis adjustment stage so that the optical axis of the second camera and the tip end of the first probe match each other, the camera image processing unit calculates a first separation distance between the tip end of the first probe and a tip end of the second probe on the projection plane of the second camera from the optical image of the second camera while the optical axis of the second camera and the tip end of the first probe match each other, the camera optical axis adjustment stage control unit controls the second camera optical axis adjustment stage so that the optical axis of the second camera and the tip end of the second probe match each other, and outputs a movement amount of the optical axis of the second camera, the camera image processing unit calculates a second separation distance between the tip end of the first probe and the tip end of the second probe on the projection plane of the second camera from the optical image of the second camera while the optical axis of the second camera and the tip end of the second probe match each other, and the camera image processing unit calculates a vertical distance between the tip end of the first probe and the sample surface and a vertical distance between the tip end of the second probe and the sample surface based on the first separation distance, the second separation distance, and the movement amount of the optical axis of the second camera.

11. The probe device according to claim 2, further comprising:

a charged particle beam column that emits a charged particle beam;

a base stage on which the sample stage and the probe unit are mounted; and a sample chamber that includes an observation area and a probe adjustment area, wherein the base stage is disposed within the sample chamber and is horizontally movable between the observation area and the probe adjustment area, and when the base stage is located in the observation area, the charged particle beam is emitted from the charged particle beam column to the sample, and when the base stage is located in the probe adjustment area, the first camera images the sample and the probe.

12. The probe device according to claim 11, wherein the stage control unit controls the base stage so that the base stage moves to the probe adjustment area when an inspection position of the sample is changed, when the sample is changed, or when an operation distance of the charged particle beam is changed.

13. The probe device according to claim 11, further comprising:

a detector that detects charged particles emitted when the sample is irradiated with the charged particle beam; and a detector signal processing unit that outputs a charged particle image from a detection signal from the detector, wherein the stage control unit controls the probe unit so that the probe comes into contact with the predetermined position on the sample surface based on the charged particle image.

14. The probe device according to claim 11, further comprising:

a sample height measurement unit that measures a height of the sample.

* * * * *